(12) United States Patent
Xie et al.

(10) Patent No.: US 10,029,943 B2
(45) Date of Patent: Jul. 24, 2018

(54) ROTARY ATOMISER FOR ATOMISING MOLTEN MATERIAL

(75) Inventors: Dongsheng Xie, Ormond (AU);
Bernard Washington, Victoria (AU);
Steven Sanetsis, Oakleigh (AU)

(73) Assignee: Commonwealth Scientific and Industrial Research Organisation (AU)

( * ) Notice: Subject to any disclaimer, the term of this patent is extended or adjusted under 35 U.S.C. 154(b) by 1447 days.

(21) Appl. No.: 13/001,293

(22) PCT Filed: Jun. 29, 2009

(86) PCT No.: PCT/AU2009/000835
§ 371 (c)(1),
(2), (4) Date: Mar. 18, 2011

(87) PCT Pub. No.: WO2009/155667
PCT Pub. Date: Dec. 30, 2009

(65) Prior Publication Data
US 2011/0163173 A1     Jul. 7, 2011

(30) Foreign Application Priority Data

Jun. 27, 2008 (AU) .................. 2008903296

(51) Int. Cl.
*B22F 9/10* (2006.01)
*C04B 5/00* (2006.01)
(Continued)

(52) U.S. Cl.
CPC .................... *C04B 5/00* (2013.01);
*B01J 2/04* (2013.01); *B22F 9/10* (2013.01);
*C04B 18/141* (2013.01);
(Continued)

(58) Field of Classification Search
CPC ... B22F 9/082; B22F 9/10; C04B 5/00; C04B 18/141; B01J 2/04; C22B 1/14; C23C 4/123; B22D 23/003
(Continued)

(56) References Cited

U.S. PATENT DOCUMENTS 3,797,978 A * 3/1974 Young ................ B22F 9/10
264/8
3,975,184 A * 8/1976 Akers ................ B22F 9/14
264/10
(Continued)

FOREIGN PATENT DOCUMENTS

JP     52-005659 A     1/1977
JP     54-038259 A     3/1979
(Continued)

OTHER PUBLICATIONS

Japanese Office Action for corresponding Japanese Patent Application No. 2011-515021 mailed Jan. 29, 2013.
(Continued)

*Primary Examiner* — Alexander Valvis
(74) *Attorney, Agent, or Firm* — Merchant & Gould P.C.

(57) ABSTRACT

A rotary atomizer for receiving molten material and projecting droplets of the molten material there from; the rotary atomizer having a rotating well for receiving molten material. The well comprising a base and a peripheral wall extending from a peripheral rim around the base, the top of the peripheral wall having an inner top edge and a lip region extending away from the inner top edge at an angle of 0-60 degrees below the horizontal. Preferably the upper region of the peripheral side wall extending to the inner top edge is substantially vertical.

3 Claims, 2 Drawing Sheets

(51) Int. Cl.
   *B01J 2/04* (2006.01)
   *C04B 18/14* (2006.01)
   *B22F 9/08* (2006.01)
   *C22B 1/14* (2006.01)
(52) U.S. Cl.
   CPC .................. *B22F 9/082* (2013.01); *C22B 1/14* (2013.01); *Y02W 30/94* (2015.05)
(58) Field of Classification Search
   USPC ........... 239/699, 700, 703, 222.11, 223, 224, 239/128, 132; 264/8; 425/8
   See application file for complete search history.

(56) References Cited

U.S. PATENT DOCUMENTS

| | | | | |
|---|---|---|---|---|
| 4,027,718 | A * | 6/1977 | Lundgren | 75/334 |
| 4,215,818 | A * | 8/1980 | Hopkinson | B05B 5/043 239/3 |
| 4,218,410 | A | 8/1980 | Stephan et al. | |
| 4,259,270 | A * | 3/1981 | Winter | B22F 9/008 164/348 |
| 4,613,076 | A * | 9/1986 | Dietz et al. | 239/3 |
| 5,735,931 | A | 4/1998 | Featherstone | |
| 6,521,173 | B2 * | 2/2003 | Kumar | B22F 1/0088 419/23 |
| 7,261,529 | B2 * | 8/2007 | Persyn et al. | 425/8 |

FOREIGN PATENT DOCUMENTS

| | | |
|---|---|---|
| JP | 62-114755 A | 5/1987 |
| JP | S64-205 A | 1/1989 |
| JP | 2007-332406 A | 12/2007 |
| SU | 395 172 A1 | 8/1973 |
| WO | WO 89/00470 A1 | 1/1989 |

OTHER PUBLICATIONS

Extended European Search Report for corresponding European Patent Application No. 09768640.6 dated May 8, 2017, 9 pgs.
Examination Report for corresponding European Patent Application No. 09768640.6 dated Apr. 16, 2018, 6 pgs.

* cited by examiner

ROTARY ATOMISER FOR ATOMISING MOLTEN MATERIAL

This application is a National Stage Application of PCT/AU2009/000835, filed 29 Jun. 2009, which claims benefit of Serial No. 2008903296, filed 27 Jun. 2008 in Australia and which applications are incorporated herein by reference. To the extent appropriate, a claim of priority is made to each of the above disclosed applications.

FIELD OF THE INVENTION

This invention relates to an apparatus and method for atomising a molten material. Particularly, this invention related to granulation of a molten material.

BACKGROUND OF THE INVENTION

Some types of molten material granulators include a rotary atomiser. In this type of granulator, molten material is placed in contact with a rotary dish and is then projected radially away from the centre of the rotary atomiser by centrifugal force. Ideally, the projected droplets of molten material sufficiently solidify and cool in the time after being projected from the rotary atomiser and before being collected for further use. Various granulator and rotary atomiser designs currently exist.

Some disadvantages of these current designs are (i) their large dimensions, the granulator often needing to be up to 10 m in radius to allow sufficient solidification of the molten material droplets projected from the rotary atomiser, (ii) the costly inefficient use of large airflows to assist in the cooling of the molten material droplets projected from the rotary atomiser, (iii) the generation of 'slag wool' in molten slag granulators that causes costly clean-up requirements and decreases operating efficiency of the granulator; slag wool being fibre-like solidified slag that forms from non-ideal rotary atomiser design, and (iv) the residual heat remaining in the projected droplets during the collection stage causing them to stick to surfaces, agglomerate and/or remelt.

SUMMARY OF THE INVENTION

The inventors have designed a molten material granulator including a rotary atomiser that is improved over those currently in existence.

In one aspect there is provided a granulator comprising

- a rotary atomiser for receiving molten material and projecting droplets of the molten material there from; the rotary atomiser having
- a rotating well for receiving molten material, the well comprising a base and a peripheral wall extending from a peripheral rim around the base, the top of the peripheral wall having an inner top edge and a lip region extending away from the inner top edge at an angle of 0-60 degrees below the horizontal.

In a preferred form of the invention, the upper region of the peripheral side wall extending to the inner top edge is substantially vertical. The lip region of the peripheral wall is preferably spaced a distance from the peripheral rim of the base. When the base is a flat surface, the height of the peripheral side wall and hence the distance of the lip region from the peripheral rim is the depth of the well. In this embodiment, the base and the peripheral wall may meet substantially at right angles providing a substantially vertical wall. The base may be configurations other than flat such as conical or polyhedral shaped so that the depth of the well is greater than the height of the peripheral wall. However even in these embodiments, there is provided a spaced distance from the peripheral rim of the base to the lip region of the peripheral wall.

The peripheral wall preferably comprises an upper region and a lower region. In the preferred embodiment, the upper and lower regions are aligned collinearly so that the peripheral wall is straight. However the lower region of the peripheral wall may be inclined to the base of the well from between 75° to 105°. Irrespective of the alignment of the upper to the lower region of the peripheral wall, it is important for the operation of the invention that the upper region of the peripheral wall extending to the inner edge is substantially vertical.

In another aspect there is provided a method of granulating molten material comprising the steps of

- forming a pool of molten material in a well of a rotating rotary atomiser, the well comprising a base and a peripheral side wall extending from a peripheral rim around the base of the well, the peripheral wall having an inner top edge and a lip region sloping away from the inner top edge at an angle of 0-60 degrees below the horizontal;
- rotating the rotary atomiser at a speed to project droplets of molten material from the lip region and
- solidifying the molten material as granules. It is preferable that the method further includes the step of solidifying a substantial portion of the droplets in flight; and directing the solidified droplets towards a collector.

In a preferred form of this aspect, the molten material added to the pool progresses up the peripheral wall under the influence of the centrifugal force generated by the rotating atomiser. The molten material reaches the inner edge of the peripheral wall after a residence time in the well before being projected from the atomiser.

The applicants have found that by momentarily disrupting the flow of molten material and maintaining a well of molten material from where it is added in the centre to the outer edge of the atomiser, it helps molten material to spread more evenly in the well, to form thin liquid film at the lip before being atomised to produce fine droplets cleanly at the lip.

This is in contrast to the prior art discs where the molten material is almost immediately spread to the outside edge of the disc.

In another aspect there is provided a rotary atomiser comprising

- a well for receiving molten material, the well comprising a base and a peripheral wall extending from a peripheral rim around the base, the top of the peripheral wall having an inner top edge and a lip region extending away from the inner top edge at an angle of 0-60 degrees below the horizontal.

In another aspect there is provided a method of atomising molten material comprising the steps of

- forming a pool of molten material in a well of a rotating rotary atomiser, the well comprising a base and a peripheral side wall extending from a peripheral rim around the base of the well, the peripheral wall having an inner top edge and a lip region sloping away from the inner top edge at an angle of 0-60 degrees below the horizontal;
- rotating the rotary atomiser at a speed to project droplets of molten material from the lip region, the molten material having a residence time within the well.

In preferred forms of the above aspects the molten material is slag.

The height of the peripheral wall, as defined by the vertical distance from the inner edge of the top of the peripheral wall to the base, may be 10-50% in relation to the diameter of the base The height of the peripheral wall may be from about 4 to about 50 mm. In these embodiments the diameter of the base may be from about 40 to about 100 mm.

In some embodiments the granulator may be an enclosed or substantially enclosed chamber.

DETAILED DESCRIPTION OF THE EMBODIMENTS

Figure 1:
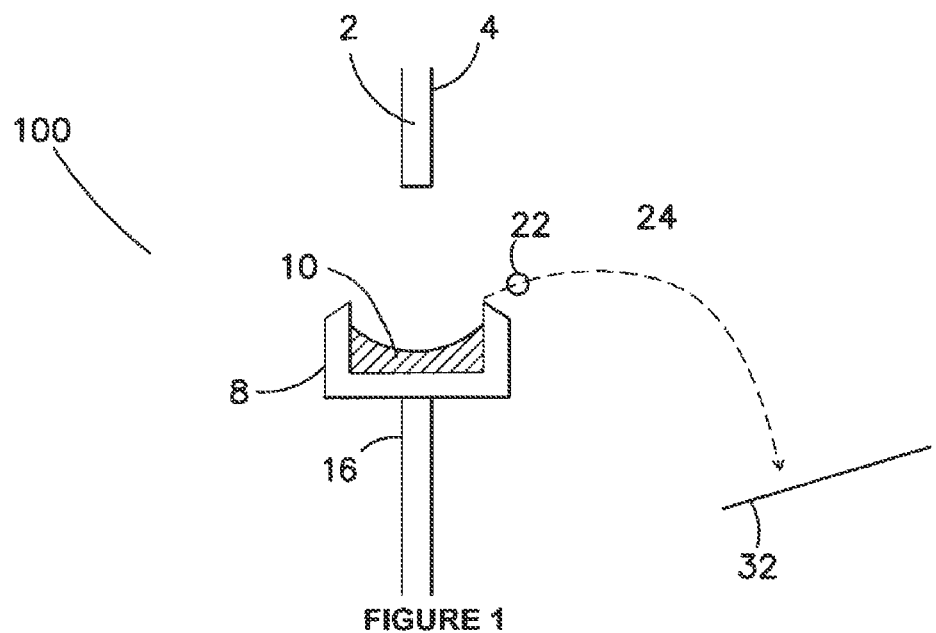
FIG. 1 is a diagram showing a cross-section taken through a central axis of a granulator and rotary atomiser of the present invention, showing a reduced number of structural features for clarity.
Figure 2:
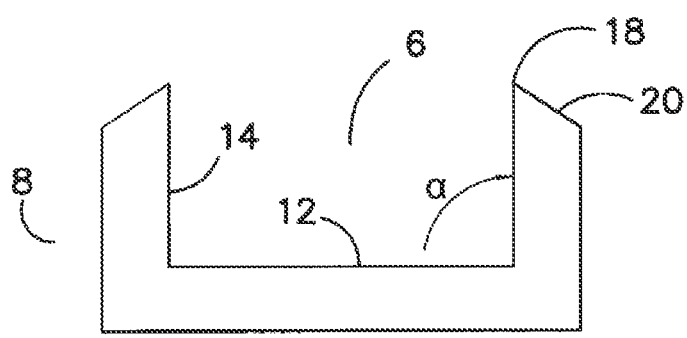
FIG. 2 is a diagram showing a cross-section taken through a central axis of an embodiment of a rotary atomiser of the present invention.
Figure 3:
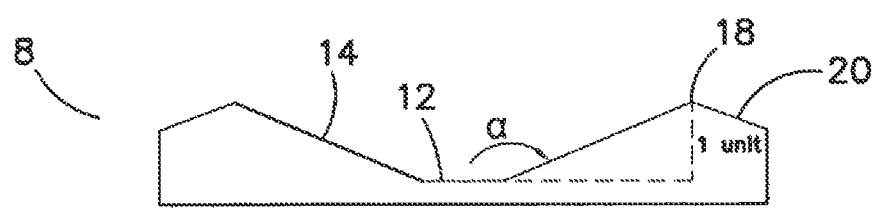
FIG. 3 is a diagram showing a cross-section taken through a central axis of another embodiment of a rotary atomiser of the present invention.

FIG. 1 illustrates the features and operation of the rotary atomiser of the present invention. In typical operation, molten material 2 is delivered to rotary atomiser 8 by means of delivery means 4. Delivery means 4 directs molten material 2 to well 6 of the rotary atomiser 8 which is spinning at a spinning rate and where it collects and forms a pool of molten material 10. When rotary atomizer 8 is rotated via spinning means 16 about a substantially vertical axis, forces cause the pool of molten material 8 to rise up the peripheral wall 14 of rotary atomiser 8. At a certain spinning rate, the pool of molten material will rise to the top of the peripheral wall 14. Beyond this certain spinning rate, the molten material will be forced over inner edge 18 at the top of peripheral wall 14. The molten material will then contact at least a portion of lip region 20 prior to being projected from the rotary atomiser 8. The droplets of molten material 22 thus formed are projected with a trajectory 24 into the interior of the granulator and are ultimately progressed towards a collector 32.

Significant factors affecting the design of rotary atomiser 8 and granulator include: the flow rate of molten material 2 through delivery means 4, the spinning rate of the rotary atomiser 8, the projection temperature of the droplets of molten material 22, the trajectory 24 including the distance and time of flight of the droplets of molten material 22, the size of the droplets of molten material 22, the material that constitutes molten material 2, the absence or presence of additional cooling (such as an annular airflow and/or cooling of the impact surface). That is, the exact design and operating conditions of any one component of granulator is often dependent on the design and operating conditions of any other component of granulator, as well as being dependent on the physical and chemical properties of the material being granulated. For instance, a higher flow rate may require a larger well 6 volume; a hotter delivery temperature may require a larger well 6 volume and/or a longer trajectory; a molten material having a lower thermal conductivity may require a longer trajectory. Despite this, this description does provide values to serve as a guide for typical design parameters and operating conditions.

Molten material 2 may be any molten material from which it is desirous to produce a granulated form. For instance, the molten material may be a molten metal, polymer, matte or glass. In preferred embodiments the molten material is a by-product from the process of smelting ore to purify metals (also known as slag). Granulated slag can be used for any purpose, but is particularly useful in the manufacture of cement and concrete.

Delivery means 4 may be any suitable means known in the art. For instance, delivery means 4 may be a tube, pipe, channel, trough or other form of conduit. The molten material 2 may be discharged from the end of delivery means 4 by any means known in the art. For instance, molten material 2 may be discharged by a nozzle, spout, tap or other means of controlling the delivery. Alternatively, molten material 2 may be discharged from the end of delivery means 4 without any other means of controlling the delivery. In the context of slag, the delivery means 4 may be referred to as a slag drop.

The molten material 2 is delivered via delivery means 4 at an elevated temperature (herein after referred to as the 'delivery temperature'). The delivery temperature may be any at which the material is substantially molten, and is dependent on the material itself. In the context of typical iron-making slags, the delivery temperature of molten material 2 may be from about 1400° C. to about 1600° C. Clearly, the delivery temperature may be slightly higher than the temperature at the time the molten material 2 is received by well 6 due to heat loss between the end of delivery means 4 and well 6, but for the purposes of this description the two shall be considered equivalent. The flow rate of molten material 2 through delivery means 4 and into well 6 of the rotary atomiser 8 is variable and dependent on the design and operating conditions of other components of the granulator, and on the material being granulated. Typically, the flow rate may be from about 1 kg/min in demonstration or pilot plants to several tonnes/min in commercial industrial plants. This flow rate may be referred to as a tapping rate.

Rotary atomiser 8 is positioned such that molten material 2 discharged from delivery means 4 is received by well 6. Spinning means 16 is used to rotate or spin the rotary atomiser about a substantially vertical axis. Spinning means 16 may be any known in the art. For instance, spinning means 16 may be magnetically driven or gear driven. The spinning rate is variable and dependent on the design and operating conditions of other components of the granulator, and on the material being granulated. Typically, the spinning rate may be from about 600 rpm to about 3000 rpm. The design of the rotary atomiser 8 is such that substantially all of the pool of molten material 10 is projected as droplets of molten material 22 and not as a sheet or ribbon of molten material as is the case with rotary atomisers of the prior art. In the context of slag, the projection of droplets of molten material 22 suppresses the formation of slag wool. The shape and size of the droplets of molten material 22 is variable and dependent on the design and operating conditions of other components of the granulator, and on the material being granulated. Typically, the droplets of molten material 22 are substantially spherical having a diameter of from about 0.5 mm to about 5 mm (more than 90% below 2 mm in diameter) and may be formed within a uniform size range when formed at constant conditions. The velocity of projection of the droplets of molten material 22 from rotary atomiser 8 is variable and dependent on the design and operating conditions of other components of the granulator, and on the material being granulated. Typically, velocity of projection of the droplets of molten material 22 from the rotary atomiser 8 is from about 1.5 m/s to about 8 m/s.

Well 6 is shown in more detail in FIGS. 2 3, 5(a) and 5(b). The dimensions of well 6 are such that a pool of molten material 10 forms within well 6. Particularly, the dimensions of well 6 are such that a pool of molten material 10 forms within well 6 when the rotary atomiser 8 is being rotated by spinning means 16. That is, molten material 2 forms a pool of molten material 10 that has a residence time within well 6 and the peripheral wall 14 and inner edge 18 act as a weir over which the molten material projects.

Well 6 of rotary atomiser 8 may be constructed from any material known in the art. The preferred requirements for the material of the atomiser are low cost, high thermal conductivity and workability. For instance, rotary atomiser 8 may be constructed from a refractory material, or copper. Preferably, rotary atomiser 8 is constructed from stainless steel or cast iron.

The cooling due to heat loss through slag-metal interface allows a layer of molten material 2 in the pool of molten material 10 to solidify on the surface of well 6. This solidified layer serves to protect the surface from erosion by aggressive molten slag and to reduce heat transfer (by more than an order of magnitude in the case of a metal spinning disc) from the molten slag pool to avoid overheating and melting of the well 6. Combined with controlled cooling of the well 6 from a cooling system 50 underneath when required, the present invention allows for continuous operation of the spinning disc (made from metal or non-metal refractory material) under well protected conditions.

Under steady state conditions, the pool of molten material receives molten material, spreads molten material under centrifugal force and eventually atomises molten material to produce fine droplets from the inner edge 18 of the top of the peripheral wall 14. The pool of molten material and a freezing layer provide favourable conditions for smooth flow and spreading of molten material without substantial heat loss. The design of weir (18 and 20) allows for smooth atomisation at inner edge 18 as explained below.

Rotary atomisers of the prior art typically have a flat or concave disc design and molten material is projected from the rotary atomiser substantially immediately after being received by the rotary atomiser. The flat surface may cause molten material to slip or bounce off without ideal spreading before being atomised. Additionally molten material may solidify on the flat metal surface. The solidified layer is not able to adhere to the flat surface and thus lifts off the surface. In some cases, metal spinning disc was coated with refractory surface to protect the metal. However it is difficult to form and bond a stable refractory coating on the metal surface and the refractory surface itself is subjected to erosion by aggressive molten slag.

Well 6 has a design such that molten material 2 forms a pool of molten material 10 having a residence time. The dimensions of well 6 are variable and dependent on the design and operating conditions of other components of the granulator, and on the material being granulated. Well 6 is defined by base 12 and peripheral wall 14. Peripheral wall 14 may be inclined relative to base 12. The inclination should be such that the angle $\alpha$ between base 12 and the peripheral wall 14 is greater than about 60 degrees. For instance, the angle $\alpha$ between base 12 and peripheral wall 14 may be from about 60 degrees to about 165 degrees. Preferably, the angle $\alpha$ between base 12 and peripheral wall 14 may be from about 80 degrees to about 100 degrees.

The depth of well 6, as defined by the vertical distance from the inner edge 18 of the top of the peripheral wall 14 to the base 12, may be less than the diameter of the well 6 at its inner edge 18. The ratio of the depth of well 6 to the diameter of well 6 may be from about 1:10 to about 1:2. Preferably, the ratio of the depth of well 6 to the diameter of well 6 may be from about 1:6 to about 1:3. More preferably, the ratio of the depth of well 6 to the diameter of well 6 may be from about 1:5 to about 1:4. Typically, the depth of well 6 is from about 4 mm to about 50 mm. Typically, the diameter of base 12 is from about 40 mm to about 100 mm. An atomiser of these dimensions is capable of operating at a tapping rate of typically 100-800 kg/hr.

A further way to define the relative dimensions of the well is, if, when looking at a cross-sectional vertical plane through the central vertical axis of the rotary atomiser (as depicted in FIGS. 2 and 3), peripheral wall 14 is considered to define the hypotenuse of a right triangle, and the depth of well 6 is considered to define one side of the right triangle of length 1 unit, then the length of the other side of the right triangle may be from about 0 units to about 1 units.

Inner edge 18 at the top of peripheral wall 14 also marks an inner edge of lip region 20. Lip region 20 then slopes away from the inner edge at an angle horizontally or below horizontal so that an outer portion of the lip region 20 is at the same level or lower than the inner edge. That is, the lip region slopes downwardly either in a straight line or in steps or stages. The angle at which the lip region 20 slopes away from inner edge 18 may be from about 0 degrees to about 60 degrees below horizontal. Preferably, the angle at which the lip region 20 slopes away from inner edge 18 may be 5 to 60 degrees and most preferably from about 15 degrees to about 45 degrees below horizontal. Preferably, the length of lip region 20 is at least about 10 mm. This is different to rotary atomisers of the prior art.

Without wishing to be bound by theory, the inventors believe that the inner edge formed by the substantially vertical upper region of the peripheral side wall 14 and the horizontal or downwardly sloping lip region 20 provides for a better controlled and more efficient release of the droplets of molten material 22. In more detail, it seems that molten material 2 from the pool of molten material 10 contacts at least a portion of the lip region 20 prior to being projected from the rotary atomiser 8. The contact at the lip and the continued projection of molten material droplets from the inner edge 18 causes a thin layer of solidified molten material to form on the lip region 20 extending horizontally to a few millimeters from the inner edge 18. An air gap between this thin solid layer and sloping lip 20 hinders undesirable fast cooling of the thin layer of molten material formed at the lip before atomisation (droplet formation), which has a detrimental effect on smooth atomisation at a spinning disc (eg formation of slag wool or lumpy particles). The continued projection of molten material from this solidified thin layer provides favourable conditions for producing more spherical droplets of molten material 22.

That is, under continuous steady state operation the average temperature of the pool of molten material 10 should remain constant. However, if a process variable is changed, for instance the delivery temperature or flow rate of molten material 2, then the temperature of the pool of molten material 10 may change, thus potentially disrupting further downstream operations. Thus, in some embodiments, the thickness of the material used to construct the rotary atomiser 8 is such that provides an ability to have a more stable temperature for the pool of molten material 10. That is, the bulk of the rotary atomiser can be used to absorb energy in the form of heat from the pool of molten material 10. This advantage is not gained by rotary atomisers of the prior art, which typically comprise a flat or concave disc constructed from a relatively thin piece of metal or refractory material.

Figure 4:
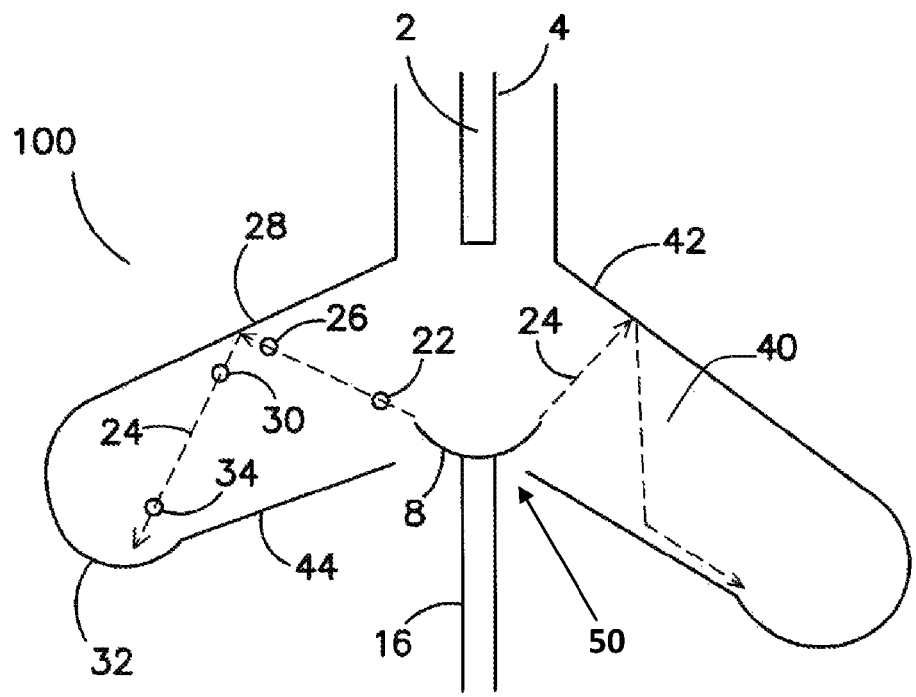
FIG. 4 is a diagram showing a cross-section taken through a central axis of a granulator for use with the present invention.
Figure 5A:
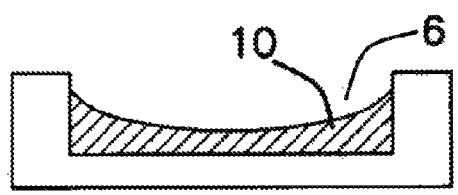
FIGS. 5(a) and 5(b) are sectional views of embodiments of the rotary atomiser in accordance with the invention.
Figure 5B:
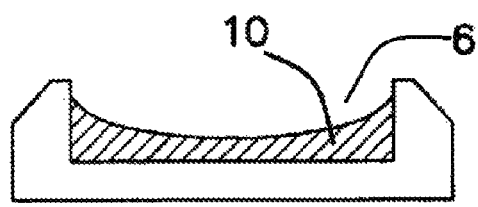

In use within a granulator shown in FIG. 4, rotary atomiser 8 is typically positioned substantially centrally within the granulator. More typically, since the rotary atomiser 8 is spinning and projecting droplets of molten material 22 radially at potentially any and all points around its circumference, it is preferable to have granulator being substantially annular. Any collector 32 known in the art may be used for the collection of granulated material 34. For instance, the collector 32 may simply be an opening of any dimensions positioned such that at least partially solidified droplets of molten material 22 are capable of exiting granulator, or may be an annular trough with at least one aperture for the exit of at least partially solidified droplets of molten material 22. Rotary atomiser 8 of the present invention can be used in any granulator known in the art.

Droplets of molten material 22 are projected from rotary atomiser 8 into a chamber 40, which may be an enclosed or substantially enclosed chamber. After impact of partially solidified droplets 26 with impact surface 28 to form fractured droplets 30, granulated material 34 is directed towards a collector, which in FIG. 4 is depicted as being disposed towards the periphery of granulator 100 as collector 32.

Chamber 40 may have an upper boundary surface 42 that is of a substantially frusto-conical shape (also referred to as a frustum). The frusto-conical shape of upper boundary surface 42 converges upwardly toward delivery means 4 and creates an acute frusto-conical angle with vertical. Upper boundary surface 42 may extend to delivery means 4 or extend only partially to delivery means 4. Impact surface 28 may be positioned within upper boundary surface 42. Preferably, at least a portion of upper boundary surface 42 is impact surface 28.

Chamber 40 may have a lower boundary surface 44. Lower boundary surface 44 may be of any shape. A particular preferred shape for lower boundary surface 44 is one suitable for directing granulated material 34 towards a collector 32. For instance, lower boundary surface 44 may also be of a substantially frusto-conical shape converging either upwardly or downwardly towards the central axis of granulator 100. FIG. 4 depicts lower boundary surface 44 as an upwardly converging frustum. A collector is then preferably positioned within or adjacent to lower boundary surface 44. For instance, in the case of lower boundary surface 44 being an upwardly converging frustum, collector 32 may be positioned at a peripheral location. In the case of lower boundary surface 44 being a downwardly converging frustum, the collector may be positioned at a more central location. In the latter case, the location of the collector need not be at the most central location, but instead may be any position more central than the periphery of the granulator.

Upper boundary surface 42, impact surface 28, and/or lower boundary 44 may be cooled. For instance, upper boundary surface 42, impact surface 28, and/or lower boundary surface 44 may be cooled by air, water, or other refrigerant, or any other material known in the art, by contact of these with the exterior surfaces of upper boundary surface 42, impact surface 28, and/or lower boundary surface 44.

Also shown in FIG. 4 is an alternative trajectory 24. The trajectory 24 is variable and dependent on the design and operating conditions of other components of the granulator 100, and on the material being granulated. Most significantly, the design and operation of the rotary atomiser 8 are important in the nature of the resultant trajectory 24. In both examples of trajectory 24 shown in FIG. 4, the above described embodiments are present. That is, droplets of molten material 22 are projected from the rotary atomiser towards an impact surface 28, and are then redirected as fractured droplets 30 and then granulated material 34 towards a collector 32. In both instances the trajectory of the droplets have a tangential as well as a radial component. In the case of trajectory 24, the particle spirals downwardly on lower surface 44 towards collector 32.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A slag granulator comprising:
   a chamber including:
   a rotary atomiser in which molten slag is received and projected as droplets of molten slag there-from;
   the rotary atomiser having a rotating well for receiving the molten slag and configured to form a pool of molten slag therein, the well comprising a base and a peripheral wall extending from a peripheral rim around the base, the peripheral wall comprising an inner top edge and a lip region extending away from the inner top edge at an angle of 0-60 degrees below the horizontal, wherein a region of the peripheral wall extending to the inner top edge is substantially vertical;
   a well cooling system for controlled cooling of the well from underneath a surface of said well, wherein the well cooling system comprises at least one of air, water, and a refrigerant;
   an upper boundary surface which is angled upwardly toward a molten slag delivery arrangement, at least a portion of upper boundary surface comprising an impact surface disposed with the trajectory of the droplets of molten slag projected from the rotary atomiser; and
   a lower boundary surface angled to direct solidified droplets towards a collector, wherein the lip region and surfaces within the well have a layer of solidified slag thereon as a result of cooling due to heat loss through the well and said controlled cooling of the well from underneath the well by the well cooling system, and wherein, in use, droplets of molten material are projected from the rotary atomiser towards the impact surface, and are then redirected as fractured droplets or granulated material towards the collector.

2. The granulator of claim 1 wherein the lip region of the peripheral wall is spaced a distance from the peripheral rim of the base.

3. The granulator of claim 1 wherein the base is a flat surface and the base and the peripheral wall meet at substantially right angles providing a substantially vertical wall.

* * * * *